Sept. 5, 1950           F. HINRICHS           2,521,166
RELIEF VALVE
Filed June 18, 1945
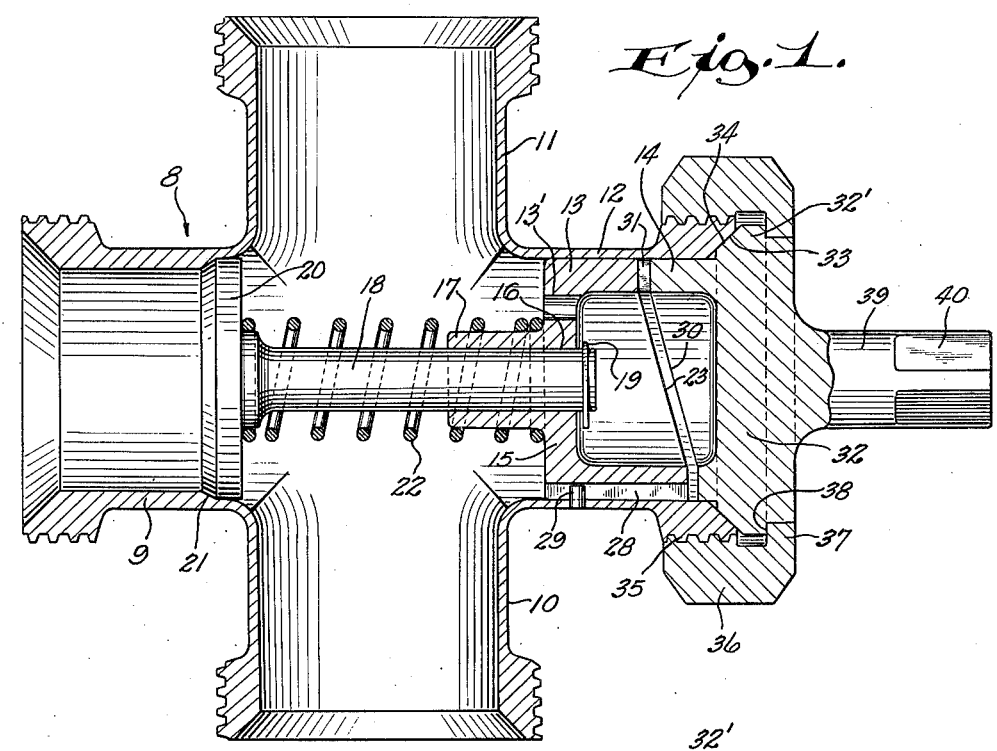
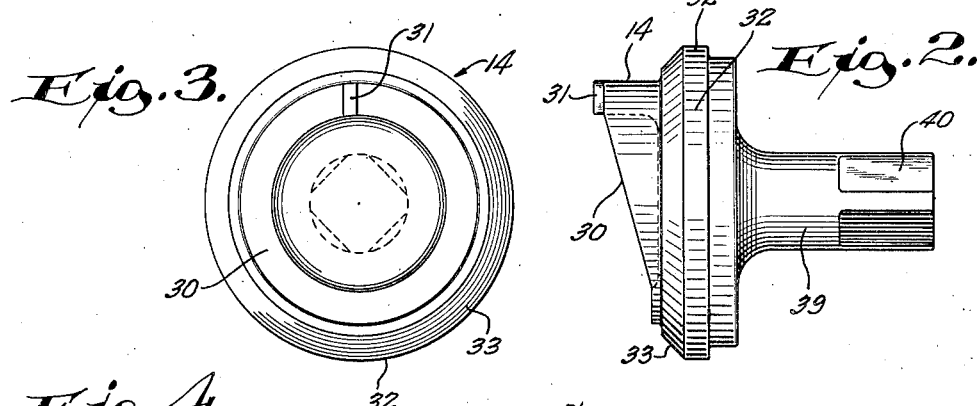
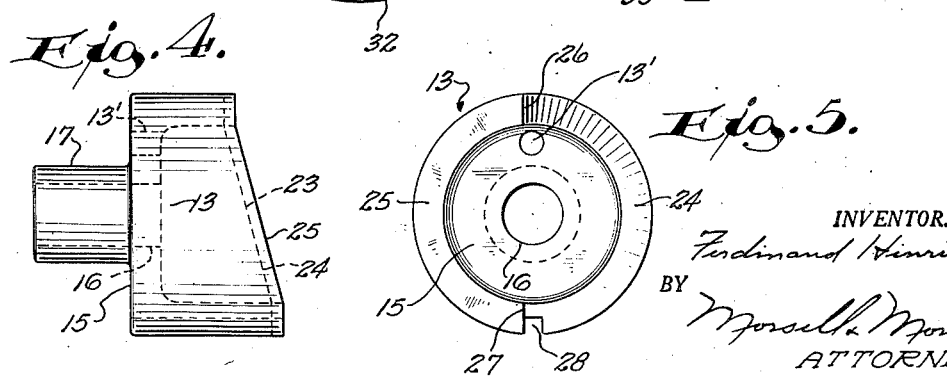
INVENTOR.
Ferdinand Hinrichs
BY Morsell & Morsell
ATTORNEYS.

Patented Sept. 5, 1950

2,521,166

UNITED STATES PATENT OFFICE 2,521,166

RELIEF VALVE

Ferdinand Hinrichs, Kenosha, Wis., assignor to Tri-Clover Machine Co., Kenosha, Wis., a corporation of Wisconsin Application June 18, 1945, Serial No. 600,141

3 Claims. (Cl. 137—53)

This invention relates to improvements in relief valves.

In the usual type of relief valve there is a spring which normally maintains the valve in closed position. In those valves in which the tension of the spring is adjustable, a threaded member engaging the spring has been customarily utilized. In relief valves which are employed in dairy equipment, or in other equipment used in the food industry where sanitary conditions are required, the use of threading, and particularly internal threading, is objectionable.

It is a general object of the present invention to provide an improved adjustable relief valve which is particularly adapted for use in the food industry, and which eliminates the use of threading in connection with the spring adjustment member.

A further object of the invention is to provide an improved relief valve wherein the adjustment may be made more quickly than in construction where a threaded adjustment member is employed.

A more specific object of the invention is to provide a device of the class described wherein there is a cam arrangement for causing a selected amount of pressure to be exerted axially on the spring in order to predetermine the minimum pressure at which the valve will open.

With the above and other objects in view, the invention consists of the improved relief valve, and all its parts and combinations, as set forth in the claims, and all equivalents thereof.

In the accompanying drawing, illustrating one complete embodiment of the preferred form of the invention, in which the same reference numerals designate the same parts in all of the views:

Fig. 1 is a longitudinal sectional view through the valve, part of the operating handle being shown in full;

Fig. 2 is a side elevational view of the outer cam member;

Fig. 3 is an end view looking at the cam face of the outer cam member;

Fig. 4 is a side elevational view of the inner cam member; and

Fig. 5 is an end view of the member shown in Fig. 4.

Referring more particularly to the drawing, the valve casing, which may be anyone of a number of types, is indicated by the numeral 8. The casing is formed with a tubular extension 9, adapted to be connected to a conduit having material under pressure within, with the pressure acting in a direction toward the valve casing. The casing also includes tubular extensions 10 and 11 which are adapted to be connected to suitable conduits, and includes an extension 12.

The extension 12 is circular in cross section and forms a housing for an inner axially slidable cam member 13 and for an outer rotatable cam or adjustment member 14. The inner cam member 13 is cup shaped and includes a closed end 15 having a hole 16 and having a sleeve 17 projecting therefrom and in registration with said hole. A valve stem 18 has its outer end slidable in the sleeve 17 and hole 16, and projecting into the interior of the valve member 13 where it is fitted with a cotter pin 19. The inner end of the valve stem 18 is connected to the valve 20 and the latter coacts with an annular seat 21 in the usual manner.

A coil spring 22 surrounding the valve stem 18 and acting between the valve 20 and end 15 of the inner cam member serves to normally urge the valve to the closing position of Fig. 1.

The rim at the outer end of the inner cam member 13 is cut angularly as at 23 so that the rim forms a circular cam surface. The portion 24 forming the cam surface (see Fig. 5) is preferably lower than the portion 25 and there are shoulders 26 and 27 between said high and low portions. The cam member 13 may have its closed end formed with a drainage hole 13' and there is also a longitudinal slot 28 in the periphery of the member 13 which is engaged by a pin 29 to hold the cam member against rotation while permitting axial movement thereof.

The outer cam member 14 has its rim cut angularly as at 30 to conform to the cooperating rim of the inner cam member. On the high portion of the cam surface is a stop lug 31 which normally engages in the low area 24 of the inner cam member 13 and which is movable upon rotation of the outer cam member from the stop shoulder 26 to the stop shoulder 27.

While it is preferred to utilize the high and low areas 24 and 25 in conjunction with the lug 31 on the cam member 14, nevertheless, this stop feature may be eliminated if desired.

The outer end of the cam member 14 has an enlarged head portion 32 forming a projecting annular flange 32' with the inner face of said flange angled as at 33 to coact with an annular tapered seat 34 at the end of the valve casing extension 12. The outer end of the extension 12 is of enlarged diameter and is exteriorly threaded as at 35 to cooperate with a union nut 36. The union nut has an inwardly projecting annular flange 37 which engages an annular shoulder 38 on the head of the cam member 14 to maintain the latter in position. The cam member 14 also has an outwardly projecting stem 39 formed with flattened surfaces 40 for cooperation with a turning tool or handle.

When the parts are in the position shown in Fig. 1 there is a minimum amount of pressure exerted on the valve by the coil spring 22. By rotating the stem 39 of the outer cam member in a clockwise direction the lug 31 on the cam member 14 will be caused to ride upwardly on the cam surface 24 of the inner cam member 13. The cams may be left in any desired position of adjustment. However, if rotated for approximately 180° or until the stop lug 31 engages the shoulder 27, then the spring 22 will exert a maximum amount of pressure in a closing direction on the valve 20.

It is apparent that all portions of this relief valve may be quickly and easily disassembled for cleaning by merely removing the union nut 36 and the cotter pin 19. Thus, all of the separate portions may be individually cleaned. Because of the improved construction there are no inaccessible pockets in any of the parts to retain food particles or foreign matter, and the elimination of a threaded adjustment member for the spring 22 does away with the necessity for cleaning a multitude of fine threads. Where such threading is located internally it is sometimes impossible to do a proper cleaning job and objectionable sanitary conditions may result.

Although only one form of the invention has been shown and described, it is obvious that various changes and modifications may be made without departing from the spirit of the invention, and all of such changes are contemplated as may come within the scope of the claims.

What I claim is:

1. In a relief valve having a casing provided with a valve seat and having a tubular extension provided with a smooth interior surface disposed opposite to said valve seat, a valve member cooperable with said seat and having a stem connected thereto and projecting toward the casing extension, a spring surrounding said stem and having one end engaging said valve, a cup shaped member having a closed end and an open end slidable in said casing extension with its closed end engaging the opposite end of said spring to adjust the pressure exerted by the spring on said valve and having a smooth exterior surface snugly engaging said smooth interior surface of said tubular extension, said cup shaped member having its closed end bored to slidably receive the outer end of said stem and having its open end formed with a circular cam surface, stops at each end of said cam surface, and an adjustment member having a smooth exterior portion snugly fitting said casing extension and rotatably mounted in said casing extension having means engageable with the cam surface of said cup shaped member between the stops thereon for causing slidable movement of the latter in response to the rotation of the adjustment member, said adjustment member having an enlarged head, and a union nut threaded on said casing extension and engaging said head for holding the parts in operative position and for preventing axial movement of the adjustment member.

2. In a relief valve having a casing provided with a valve seat and having a tubular extension provided with a smooth interior surface disposed opposite to said valve seat, a valve member cooperable with said seat and having a stem connected thereto and projecting toward the casing extension, a spring surrounding said stem and having one end engaging said valve, a cup shaped member having a closed end and an open end slidable in said casing extension with its closed end engaging the opposite end of said spring to adjust the pressure exerted by the spring on said valve and having a smooth exterior surface engaging said smooth interior of said tubular extension, said cup shaped member having its closed end centrally bored to slidably receive the outer end of said stem, said closed end having a concentric sleeve projecting toward the valve member from the periphery of said bore to form a guide for said stem and said cup shaped member having at its open end an outwardly projecting circular rim cut to form a cam surface, stops at each end of said cam surface, an adjustment member having a smooth exterior portion fitting said tubular extension of said casing rotatably mounted in said casing extension having means engageable with the cam surface of said cup shaped member between the stops thereon for causing slidable movement of the latter in response to the rotation of the adjustment member, said adjustment member having an enlarged head, and a union nut threaded on said casing extension and engaging said head for holding the parts in operative position and for preventing axial movement of the adjustment member.

3. In a relief valve having a casing provided with a valve seat and having a tubular extension having a smooth interior surface disposed opposite to said valve seat, said tubular extension having on the inside of its outer end an annular tapered surface, a valve member cooperable with said valve seat and having a stem connected thereto and projecting toward the casing extension, a spring surrounding said stem and having one end engaging said valve, a cup shaped member having a closed end and an open end slidable in said casing extension with its closed end engaging the opposite end of said spring to adjust the pressure exerted by the spring on said valve, said cup shaped member having its closed end centrally bored to slidably receive the outer end of said stem and having at its open end an outwardly projecting circular rim cut to form a cam surface, stops at each end of said cam surface, an adjustment member rotatably mounted in said casing extension having means engageable with the cam surface of said cup shaped member between the stops thereon for causing slidable movement of the latter in response to the rotation of the adjustment member, said adjustment member having an enlarged head with a peripheral portion of said enlarged head tapered to fit the annular tapered surface of the tubular extension, an annular shoulder on said enlarged head outwardly of said tapered peripheral portion, and a union nut threaded on said casing extension and engaging said shoulder for holding the parts in operative position and to prevent axial movement of the adjustment member.

FERDINAND HINRICHS.

REFERENCES CITED

The following references are of record in the file of this patent:

UNITED STATES PATENTS

| Number | Name | Date |
|---|---|---|
| 460,728 | Sandlass | Oct. 6, 1891 |
| 820,230 | Menges | May 8, 1906 |
| 1,044,106 | Vidar | Nov. 12, 1912 |
| 1,204,588 | Pocock | Nov. 14, 1916 |
| 1,865,672 | Bryant | July 5, 1932 |
| 2,087,356 | Parker | July 20, 1937 |

FOREIGN PATENTS

| Number | Country | Date |
|---|---|---|
| 18,506 | Norway | Jan. 4, 1909 |
| 473,247 | Great Britain | Oct. 8, 1937 |